United States Patent
Kuhn et al.

(10) Patent No.: US 9,831,478 B2
(45) Date of Patent: Nov. 28, 2017

(54) BATTERY UNIT HAVING AT LEAST ONE FIRST BATTERY MODULE AND AT LEAST ONE SECOND BATTERY MODULE IN A BATTERY HOUSING

(71) Applicant: Dr. Ing. h.c. F. Porsche Aktiengesellschaft, Stuttgart (DE)

(72) Inventors: David Kuhn, Uhingen (DE); Eric Ekert, Boennigheim-Hofen (DE)

(73) Assignee: DR. ING. H.C.F. PORSCHE AKTIENGESELLSCHAFT, Stuttgart (DE)

(*) Notice: Subject to any disclaimer, the term of this patent is extended or adjusted under 35 U.S.C. 154(b) by 93 days.

(21) Appl. No.: 14/612,388

(22) Filed: Feb. 3, 2015

(65) Prior Publication Data

US 2015/0221912 A1 Aug. 6, 2015

(30) Foreign Application Priority Data

Feb. 4, 2014 (DE) .................. 10 2014 101 335

(51) Int. Cl.
*H01M 2/10* (2006.01)
*H01M 2/20* (2006.01)

(52) U.S. Cl.
CPC ....... *H01M 2/1083* (2013.01); *H01M 2/1077* (2013.01); *H01M 2/1094* (2013.01); *H01M 2/206* (2013.01); *H01M 2220/20* (2013.01); *Y10T 29/49108* (2015.01)

(58) Field of Classification Search
CPC .. H01M 2/1077; H01M 2/1094; H01M 2/206; H01M 2/1083

USPC ..................................................... 429/99–100
See application file for complete search history.

(56) References Cited

U.S. PATENT DOCUMENTS

| | | | |
|---|---|---|---|
| 2004/0012096 A1 | 1/2004 | Kim | |
| 2011/0195284 A1* | 8/2011 | Yasui et al. | H01M 2/0242 429/82 |
| 2012/0326665 A1* | 12/2012 | Yin et al. | B60L 11/1801 320/109 |
| 2013/0235499 A1 | 9/2013 | Kang et al. | |

FOREIGN PATENT DOCUMENTS

| | | | |
|---|---|---|---|
| EP | 2 523 246 | 11/2012 | |
| JP | 2006-040547 | * 2/2006 | .............. H01M 2/10 |
| JP | 2006040547 | 2/2006 | |

(Continued)

OTHER PUBLICATIONS

German Search Report dated Oct. 7, 2014.
Korean Office Action.
Japanese Office Action dated Sep. 14, 2016.

*Primary Examiner* — Osei Amponsah
(74) *Attorney, Agent, or Firm* — Gerald E. Hespos; Michael J. Porco; Matthew T. Hespos

(57) ABSTRACT

A battery unit (1) for a motor vehicle has at least one first battery module (10) and at least one second battery module (12) in a battery housing (14). The first battery module (10) has at least one first electrical connection (16), and the second battery module (12) has at least one second electrical connection (18). The battery housing (14) has an opening (20) and an electrically conductive element (22) can be inserted through the opening (20) for electrically conductively connecting the first electrical connection (16) to the second electrical connection (18).

7 Claims, 1 Drawing Sheet

(56) References Cited

FOREIGN PATENT DOCUMENTS

| | | | |
|---|---|---|---|
| JP | 2009272234 | A | 11/2009 |
| JP | 2011210455 | | 10/2011 |
| JP | 2013149571 | A | 8/2013 |
| JP | 2014171366 | A | 9/2014 |
| KR | 100771223 | B4 | 10/2007 |

* cited by examiner

BATTERY UNIT HAVING AT LEAST ONE FIRST BATTERY MODULE AND AT LEAST ONE SECOND BATTERY MODULE IN A BATTERY HOUSING

CROSS REFERENCE TO RELATED APPLICATION

This application claims priority under 35 USC 119 to German Patent Appl. No. 10 2014 101 335.2 filed on Feb. 4, 2014, the entire disclosure of which is incorporated herein by reference.

BACKGROUND

1. Field of the Invention

The invention relates to a battery unit having at least one first battery module and at least one second battery module in a battery housing. The invention further relates to a method for safely mounting at least two battery modules.

2. Description of the Related Art

EP 2 523 246 A1 discloses a battery unit with plural battery modules, each of which has at least one electrical connection. A battery connector connects the battery modules electrically to one another via their electrical connections by to form the battery unit. However, it has been found to be disadvantageous that the electrical connection is exposed when the individual battery modules are mounted. It is feasible for a fitter to touch the electrical connection in the process of mounting the individual battery modules to form a battery unit. This may endanger the fitter due to the risk of an electric shock depending on the voltage applied to the electrical connection.

The object of the invention is to provide a battery unit for a motor vehicle that enables at least two battery modules to be combined in a simple and electrically safe manner. The object of the invention further is to provide a battery unit that has at least two battery modules and that is equipped so that when the battery modules are combined to form the battery unit, the battery unit does not present any danger of an electrically dangerous high voltage to a person.

SUMMARY OF THE INVENTION

The invention relates to a battery unit for a motor vehicle. The battery unit has at least one first battery module and at least one second battery module in a battery housing. The first battery module has at least one electrical connection, and the second battery module has at least one second electrical connection. The battery housing has an opening and an electrically conductive element can be inserted through the opening. The first electrical connection is connected electrically conductively to the second electrical connection when the electrically conductive element is introduced. The first battery module and the second battery module can be connected in parallel or in series by the introduced electrically conductive element. The first battery module and the second battery module can have a safe contact voltage of, for example, 60 volts, wherein a total voltage of 120 volts can be generated when the first battery module is connected in series to the second battery module. It is accordingly possible to tap off the total voltage, provided by the first and second battery modules, only after the electrically conductive element is introduced into the battery housing. In this case, the battery housing can totally surround the first and second battery modules so that it is possible to access the interior of the battery housing only through the opening. The opening can be designed so that the cross section of the opening is equal to the cross section of the electrically conductive element. This ensures that the electrically conductive element can be guided through the opening. It is possible to tap off voltages via the first and/or the second battery module by connecting the first and/or the second battery module only by introducing the electrically conductive element. This increases the level of safety during assembly of the battery unit by the first and the second battery module being inserted into the battery housing.

An insulating element may be arranged at a first end of the electrically conductive element and can be made from plastic. The electrically conductive element can be introduced safely by a fitter through the opening in the battery housing by virtue of the insulating element being arranged at the first end of the electrically conductive element. The insulating element can be arranged on the electrically conductive element by welding and/or adhesive-bonding. The insulating element can be a cap and can be shaped ergonomically so that the electrically conductive element can be handled more easily.

The insulating element may rest against a surface of the battery housing when the electrically conductive element is introduced into the battery housing, and the first end of the electrically conductive element may be arranged on the battery housing to protect against contact. The insulating element may be a cap and may be in the shape of a hemisphere. When the electrically conductive element is inserted through the opening in the battery housing, the insulating element can rest against the battery housing in such a way that the first end of the electrically conductive element is on and/or in the battery housing to protect against contact. The insulating element can be arranged on the battery housing in an interlocking and/or force-fitting manner after the electrically conductive element is inserted into the battery housing. To this end, the insulating element can have a latching hook, and the battery housing can have a mating latching hook. As a result, an interlocking and/or force-fitting connection can be generated between the insulating element and the housing.

The electrically conductive element may be a metal rail. The use of a metal rail provides the advantage of a dimensionally stable configuration. The metal rail may have a U-shape or may be in the shape of a T element. The metal rail can electrically conductively connect the first electrical connection to the second electrical connection by contact simply being made between the first and second electrical connections.

The battery housing may have at least one guide element, such as a guide groove in the interior of the battery housing. The guide element may guide the electrically conductive element within the battery housing. Thus, the electrically conductive element can be guided exactly to the first electrical connection and to the second electrical connection. The guide element can be arranged in the interior of the battery housing by an adhesive-bonding and/or welding process. The guide element can be made from plastic to provide insulation between the guide element and the electrically conductive element.

The guide element may be designed so that the electrically conductive element is arranged in an interlocking manner when introduced into the battery housing. The electrically conductive element can be fixed to the first and second electrical connections by an interlocking and/or force-fitting arrangement of the electrically conductive element by the guide element. Furthermore, the electrically conductive element can be fixed in its end position by the first end simply being fixed to the battery housing.

The first and second battery modules can be arranged next to one another in one level, and the first and second electrical connections can be connected to the same potential by the electrically conductive element being introduced. For example, the first and second electrical connections can be connected to a positive potential. Connection to a negative potential also is feasible. In this case, two module levels can be arranged in the battery housing. Therefore, a positive potential can be connected by insertion of an electrically conductive element in a first module level. A negative potential can be connected in a second module level that can be above the first module level. The first module level can be connected to the second module level by a second electrically conductive element. To this end, a second opening can be provided in the battery housing, and the second electrically conductive element can be guided through the second opening so that the first module level can be connected to the second module level.

The battery housing may be of electrically insulating design to provide electric-shock protection. Thus, the battery housing can be formed from plastic to ensure that no electrical voltage or no electrical potential is accessible from the outside over the entire battery housing.

The battery housing may have at least one holding element so that at least one of the first and second battery modules can be arranged on the battery housing in a force-fitting and/or interlocking manner. The force-fitting and/or interlocking arrangement of the battery modules in the battery housing ensures that the battery housing and the entire battery unit, can be inserted, for example, into a motor vehicle. As a result, the battery modules can be fixed in their position within the battery housing even in the event of the battery housing vibrating. The holding element can be formed from plastic so that the battery module can be DC-isolated from the battery housing. In addition, the holding element can be arranged in the interior of the battery housing by an adhesive-bonding and/or a welding process.

The battery housing may have a first pole and a second pole and an electrical voltage can be tapped off at the first pole and at the second pole. The first pole and the second pole may be accessible outside the battery housing. An electrical voltage that can be output by the battery modules can be tapped off via the first pole and the second pole. An insulating cap can be arranged over the first and second poles as a contact-protection. As a result, the entire outer housing can be designed to protect against contact being made with an electrical voltage. The first and second pole may be made of metal. Metal sleeves can be used as the first and second poles. It is also feasible for the first and/or the second pole to be in the form of a metallic screw.

The first electrical connection or the second electrical connection can be connected electrically conductively to the first pole or the second pole when the electrically conductive element is introduced. The electrical energy can be passed to the first and the second pole by the battery modules by virtue of the first electrical connection or the second electrical connection being connected to the first pole or to the second pole. As a result, the battery modules can be connected and the first pole and/or the second pole can be electrified at the same time as the electrically conductive element is inserted.

The invention also relates a method for safely electrically mounting at least two battery modules in a battery housing. The method may include introducing at least one first battery module having at least one first electrical connection and a second battery module having at least one second electrical connection into the battery housing, fastening the first battery module and the second battery module to the battery housing, and inserting at least one electrically conductive element into the battery housing so that the electrically conductive element electrically conductively connects the first electrical connection to the second electrical connection.

These steps make it possible to insert battery modules with a non-critical voltage into the battery housing. The battery modules then can be connected in series to generate a high-voltage battery, for example in the region of 400 volts. Battery modules, for example with an output voltage of 60 volts can be used. At the end of the step, the first battery module is electrified by virtue of an electrically conductive element being inserted into the battery housing so that the first electrical connection and the second electrical connection are connected electrically conductively to one another only by inserting the electrically conductive element. A fitter who connects the battery modules to form a battery unit is protected reliably against a high voltage in the process. As a result, a battery unit that can be used as a traction battery for a motor vehicle can be produced. In this case, the high voltage can be tapped off via first and second poles. The first and second poles can be insulated by an insulating element in such a way that contact with the first and the second pole outside the battery housing is avoided.

DETAILED DESCRIPTION

Figure 1:
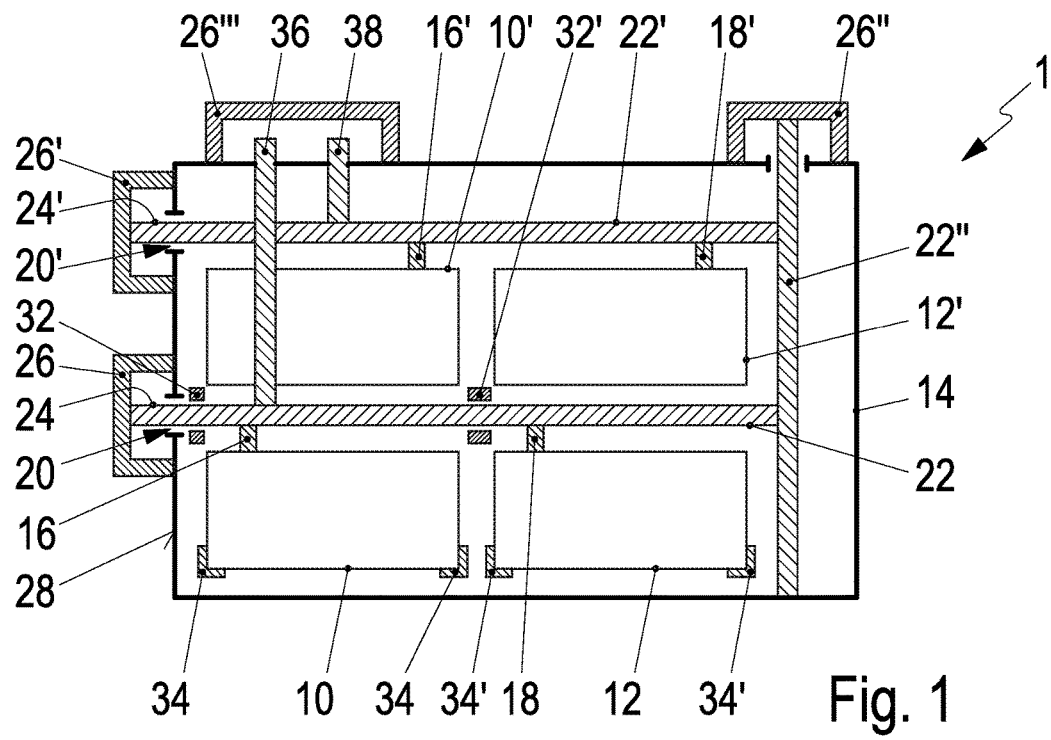
FIG. 1 shows a schematic view of a battery unit.

FIG. 1 shows a battery unit 1 that has a battery housing 14. A first battery module 10 and a second battery module 12 are arranged in a first level in the battery housing 14. The first battery module 10 is held in the battery housing 14 in an interlocking manner by a holding element 34, and the second battery module 12 similarly is held in the battery housing 14 in an interlocking manner by a holding element 34'. The first battery module 10 has a first electrical connection 16 and the second battery module 12 has a second electrical connection 18. An electrically conductive element 22 is arranged in the battery housing 14 and can be inserted into the battery housing 14 through an opening 20. An insulating element 26 is arranged at a first end 24 of the electrically conductive element 22 and can be produced from plastic. In this case, the electrically conductive element 22 is inserted into the battery housing 14 so that the insulating element 26 comes to rest directly against a housing surface 28. As a result, the first end 24 of the electrically conductive element 22 is arranged on the housing surface 28 of the external housing 14 in an insulated manner, and it is no longer possible for a person to make contact with the first end from outside the battery housing 14. The risk of a person being subjected to an electric shock is precluded in the process. Guide elements 32 and 32' are arranged in the interior of the battery housing 14 and guide the electrically conductive element 22 through the opening 20 and exactly into a desired position in the battery housing 14. A second module level with a first battery module 10' and a second battery module 12' is arranged in the interior of the battery housing 14. The first battery module 10' has a first electrical connection 16' and the second battery module 12' has a second electrical connection 18'. An electrically conductive element 22' is guided through an opening 20' and is inserted into the battery housing 14 to such an extent that the first electrical connection 16' and the second electrical connection 18' are connected electrically conductively to one another. An insulating element 26' is arranged at a first end 24' so that the first end 24' is arranged on the housing 14 in a manner to protect against contact and an electric shock. The first battery module level with the first and second battery modules 10 and 12 is connected electrically conductively to the second level with the first and second battery modules 10' and 12' by an electrically conductive element 22". The electrical energy provided by the first battery module 10 and the second battery module 12, and also the first battery module 10' and the second battery module 12', will be tapped off via a first pole 36 and a second pole 38 that are arranged outside the battery housing 14. The first pole 36 and the second pole 38 are protected by an insulating element 26'". As a result, the individual battery modules can be connected in an electrically safe manner to form an overall battery unit. A person is effectively prevented from making contact with a high voltage in the process.

Figure 2:
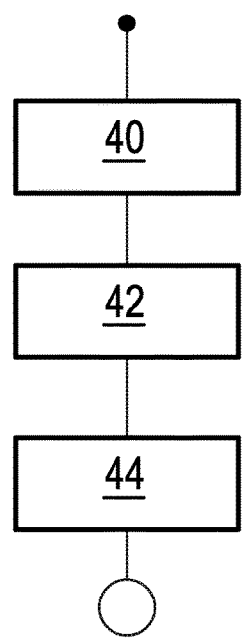
FIG. 2 shows a flowchart for safely electrically mounting at least two battery modules within a battery housing.

FIG. 2 shows a flowchart for safely electrically mounting at least two battery modules in a battery housing 14.

The method includes a first step 40 of introducing at least one first battery module 10 having at least one first electrical connection 16 and a second battery module 12 having at least one second electrical connection 18 into a battery housing 14. The method continues with a second step 42 of fastening the first battery module 10 and the second battery module 12 to the battery housing 14. The method proceeds with a third step 44 of inserting at least one electrically conductive element 22 into the battery housing 14 in such a way that the electrically conductive element 22 connects the first electrical connection 16 electrically conductively to the second electrical connection 18.

The first battery module 10 and the second battery module 12 may have a voltage which is in a safe region of, for example, 60 volts, in the first step 40. As a result, danger to a person can be precluded even when the person makes contact with the battery module when introducing the first battery module 10 or the second battery module 12. In the second step 42, the first battery module 10 and the second battery module 12 are fastened to the battery housing 14. To this end, a holding element can be provided in the battery housing 14. Thus, the first battery module 10 and the second battery module 12 can be held in the battery housing 14 in a force-fitting and/or interlocking manner. In the third step 44, the at least one electrically conductive element 22 is inserted into the battery housing 14 and electrically conductively connects the first electrical connection 16 to the second electrical connection 18. As a result, the individual battery modules are connected merely by inserting the electrically conductive element 22. In this case, the insulating elements 26 at a first end 24 of the electrically conductive element 22 ensure that a person can safely introduce the electrically conductive element 22 into the battery housing 14.

What is claimed is:

1. A battery unit for a motor vehicle, comprising:
   a battery housing having at least first and second side walls and an opening formed in the first side wall;
   non-conductive guide elements defining an insertion path in the battery housing normal to the first side wall and aligned with the opening;
   at least one first battery module in the battery housing and having at least one first electrical connection substantially aligned with the opening and adjacent to the insertion path;
   at least one second battery module in the battery housing and having at least one second electrical connection substantially aligned with the opening and adjacent to the insertion path;
   an electrically conductive pole extending through the second side wall of the housing and having an internal end adjacent the insertion path;
   an elongate electrically conductive element having opposite front and rear ends spaced apart along a longitudinal direction and having a width normal to longitudinal direction that is smaller than a width of the opening, the electrically conductive element being inserted through the opening in the side wall and along the insertion path so that the electrically conductive element electrically conductively connects the first electrical connection and the second electrical connection to the internal end of the pole when the electrically conductive element is introduced into the battery housing; and
   an insulating element formed on the rear end of the electrically conductive element and enclosing the rear end of the electrically conductive element, the insulating element being dimensioned and configured to engage the first side wall around an outer periphery of the opening to close the opening and prevent contact with the electrically conductive element;
   wherein the electrically conductive element is a metal rail, and
   the elongate electrically conductive element extends substantially parallel to the second side wall of the housing and the electrically conductive pole is substantially parallel to the first side wall of the housing and substantially perpendicular to the elongate electrically conductive element.

2. The battery unit of claim 1, wherein the guide element is interlocked with the electrically conductive element when the electrically conductive element is introduced into the battery housing.

3. The battery unit of claim 1, wherein the first battery module and the second battery module are arranged next to one another at a first level, and wherein the first electrical connection and the second electrical connection are connected to the same potential as the electrically conductive element is introduced into the battery housing.

4. The battery unit of claim 3, wherein the battery housing is made at least partly of an electrically insulating material.

5. The battery unit of claim 3, wherein the battery housing has at least one holding element configured for holding at least one of the first battery module and the second battery module in the battery housing in a force-fitting or interlocking manner.

6. The battery unit of claim 3, wherein the battery housing has a first pole and a second pole, and wherein an electrical voltage can be tapped off at the first pole and at the second pole.

7. The battery unit of claim 6, wherein the first electrical connection or the second electrical connection is connected electrically conductively to the first pole or the second pole when the electrically conductive element is introduced.

* * * * *